US005093902A

United States Patent [19]

Tokumitsu

[11] Patent Number: 5,093,902

[45] Date of Patent: Mar. 3, 1992

[54] MEMORY CONTROL APPARATUS FOR ACCESSING AN IMAGE MEMORY IN CYCLE STEALING FASHION TO READ AND WRITE VIDEOTEX SIGNALS

[75] Inventor: Shigenori Tokumitsu, Fukaya, Japan

[73] Assignee: Kabushiki Kaisha Toshiba, Kawasaki, Japan

[21] Appl. No.: 652,379

[22] Filed: Feb. 7, 1991

Related U.S. Application Data

[63] Continuation of Ser. No. 174,808, Mar. 29, 1988, abandoned.

[30] Foreign Application Priority Data

Mar. 31, 1987 [JP] Japan ................................ 62-75888

[51] Int. Cl.[5] ........................ G06F 13/00; G06F 12/00

[52] U.S. Cl. ................................ 395/100; 364/237.2; 364/222.2; 364/238.4; 364/270; 364/270.1; 364/270.3; 364/270.5; 364/270.6; 364/271.6; 364/271; 364/284

[58] Field of Search ... 364/200 MS File, 900 MS File; 340/799, 750, 814

[56] References Cited

U.S. PATENT DOCUMENTS

| | | | |
|---|---|---|---|
| 3,648,250 | 3/1972 | Low et al. | 340/172.5 |
| 4.065,809 | 12/1977 | Matsumoto | 364/200 |
| 4,150,429 | 4/1979 | Ying | 364/200 |
| 4,156,904 | 5/1979 | Minowa et al. | 364/200 |
| 4,415,985 | 11/1983 | McDaniel et al. | 364/900 |
| 4,500,956 | 2/1985 | Leininger | 364/200 |
| 4,589,089 | 5/1986 | Frederiksen | 364/900 |
| 4,595,951 | 6/1986 | Filliman | 358/147 |
| 4,604,615 | 8/1986 | Funahashi | 340/750 |
| 4,691,295 | 9/1987 | Erwin et al. | 364/900 |
| 4,694,392 | 9/1987 | Ballard et al. | 364/200 |
| 4,803,475 | 2/1989 | Matsueda | 340/750 |
| 4,845,662 | 7/1989 | Tokumitsu | 364/900 |

FOREIGN PATENT DOCUMENTS

| | | |
|---|---|---|
| 3225401 | 1/1983 | Fed. Rep. of Germany . |
| 2128853 | 5/1984 | United Kingdom . |
| 8625666 | 10/1986 | United Kingdom . |
| 2196762 | 5/1988 | United Kingdom . |

OTHER PUBLICATIONS

European Patent Office Search Report with Translation.

*Primary Examiner*—Thomas C. Lee
*Assistant Examiner*—Robert B. Harrell
*Attorney, Agent, or Firm*—Cushman, Darby & Cushman

[57] ABSTRACT

An operation of a CPU is defined by a predetermined clock. An image memory stores in or read-out image data to be displayed. A display controller connects between the CPU and the image memory, and receives a command from the CPU during an access period set by time-dividing a display period and for controlling a write or read operation of the image data with respect to the image memory. A timing signal generator generates a reference pulse for representing a relationship between the clock for defining the operation of the CPU and the access period. An operation state detector receives the reference pulse generated by the timing signal generator and an access control signal output from the CPU, and detects a state of the CPU with respect to the access period. A wait signal generator generates a wait signal to the CPU, in accordance with a detection result from the operation state detector.

16 Claims, 11 Drawing Sheets

MEMORY CONTROL APPARATUS FOR ACCESSING AN IMAGE MEMORY IN CYCLE STEALING FASHION TO READ AND WRITE VIDEOTEX SIGNALS

This is a continuation of application Ser. No. 07/174,808, filed on Mar. 29, 1988, which is now abandoned.

BACKGROUND OF THE INVENTION

1. Field of the Invention

This invention relates to a data processing apparatus having a memory control function which is based on detecting the state of the CPU, and more particularly, to a data processing apparatus having a memory control function, provided in a system having an image memory such as the terminal of a VIDEOTEX system or a teletext receiver, for efficiently controlling data transfer between a CPU and the image memory.

2. Description of the Related Art

As is well known, in a system such as a terminal of a VIDEOTEX system or a teletext receiver in which transferred image data is displayed on a monitor CRT, an image memory is required for storing the image data through a CPU. In this case, the following three techniques may be made as an access scheme for the CPU to access the image data from the image memory.

(1) The CPU discriminates a display period—i.e. a period during which image data is displayed on the CRT—from a non-display period and accesses data from the image memory only during the non-display period.

(2) A display controller (e.g., a display control IC) controls all the operations of the image memory. When the CPU accesses data in the image memory, it transfers the address of the requested data and the data itself to the display controller in a port transfer system (e.g., a register). When the display controller detects transfer of the data from the CPU, it transfers the data to the image memory using an access period assigned in the display period by a work RAM.

(3) A read period, during which data in the image memory is read out to be displayed on the CRT, and an access period, during which the CPU accesses data from the image memory, are provided on a time-divisional basis. When the CPU accesses data from the image memory in the read period for display, a wait signal is output to the CPU at a suitable timing, thereby delaying access of the CPU until a possible maximum access period.

According to above technique (1), the CPU can access data from the image memory in only the non-display period, resulting in very poor data transfer efficiency. Since, according to technique (2), data can also be transferred during the non-display period by means of cycle stealing, the data transfer efficiency is relatively good. However, if an interruption or the like occurs while the CPU is transferring data to the image memory, a transfer address for the image data may be undesirably changed because data transfer is performed by the port transfer system. In order to eliminate this, management of transfer addresses in interruption processing or the like performed by the work RAM must be complicated. Therefore, extra memory address areas must be provided, and software is overloaded, with the result that data transfer efficiency is degraded. Since, according to technique (3), the CPU itself transfers data to the image memory, management of the transfer addresses in the interruption processing or the like can be easily performed. Since the time required for the CPU to access data in the image memory is generally longer than that required for the display controller to read out data from the image memory, a sufficient time margin is required for generating the wait signal at a proper timing. Therefore, if technique (3), which consumes much time for one access operation is adopted in a system such as the VIDEOTEX system or the teletext receiver in which a large amount of data is read out for display and at the same time written in the image memory, the data transfer efficiency is degraded.

Briefly, as a scheme for the CPU to access data from the image memory, technique (1) degrades the transfer efficiency, and technique (2) requires extra memory address areas and increases a burden on software. In addition, technique (3) degrades the data transfer efficiency when it is adopted in the VIDEOTEX system or the like wherein a large amount of data is read out and written in at a high speed.

SUMMARY OF THE INVENTION

It is, therefore, an object of the present invention to provide a new and improved data processing apparatus with a memory control function based on a CPU state detection in which memory control can be performed without an extra memory address area, without increasing a burden on software, and with high data transfer efficiency even in a system such as the VIDEOTEX system wherein a large amount of data is read out and written in at a high speed.

According to the present invention, there is provided a data processing apparatus comprising:

memory means having an address terminal and a data terminal for writing/reading data to be processed, the data having data of a plurality of types which appear in a predetermined period;

CPU means, having a data port and an address port for independently transmitting/receiving the data to be written in/read out from the memory means and an address for the data, a wait port for receiving a wait signal for commanding a wait operation of read/write of the data, and a clock port for receiving a reference clock, the clock port having a plurality of states including periods corresponding to the data of a plurality of types and an access period for a write or read operation of the data, the reference clock being used to operate the CPU means, and a predetermined control port for outputting a predetermined control signal in accordance with an operation of the CPU means, the CPU means being arranged to operate in accordance with a program for processing the data in correspondence to the predetermined period and the wait signal;

first control means having data fetch means and address fetch means connected between the data and address ports of the CPU means and the data and address terminals of the memory means, respectively, the data fetch means and address fetch means being connected to the predetermined control port of the CPU means; and second control means having timing signal generating means for generating the reference clock supplied to the clock port of the CPU means and defining an operation of the CPU means, and a predetermined reference pulse for presenting a relationship between the reference clock and the access period, operation state detecting means for receiving the reference pulse from the timing signal generating means and the predetermined control signal from the control port of the CPU means to detect an operation state of the CPU means with respect to the access period of the reference clock, and wait signal generating means for generating a predetermined wait signal corresponding to the state of the CPU means and supplying the predetermined wait signal to the wait port of the CPU means in accordance with a detection result from the operation state detecting means.

BRIEF DESCRIPTION OF THE DRAWINGS

These and other objects and features of the present invention can be understood through the following embodiment by reference to the accompanying drawings, in which.

DETAILED DESCRIPTION OF THE PREFERRED EMBODIMENT

First, the basis of the present invention will be described below. That is, the present invention mainly improves the technique (2) described above.

As described in U.S. Pat. No. 4,845,662 filing date Nov. 7, 1983, entitled Data Processor Employing Run Length Coding by the present applicant, technique (2) adopts a port transfer system as data transfer between a CPU and a memory.

Figure 1:
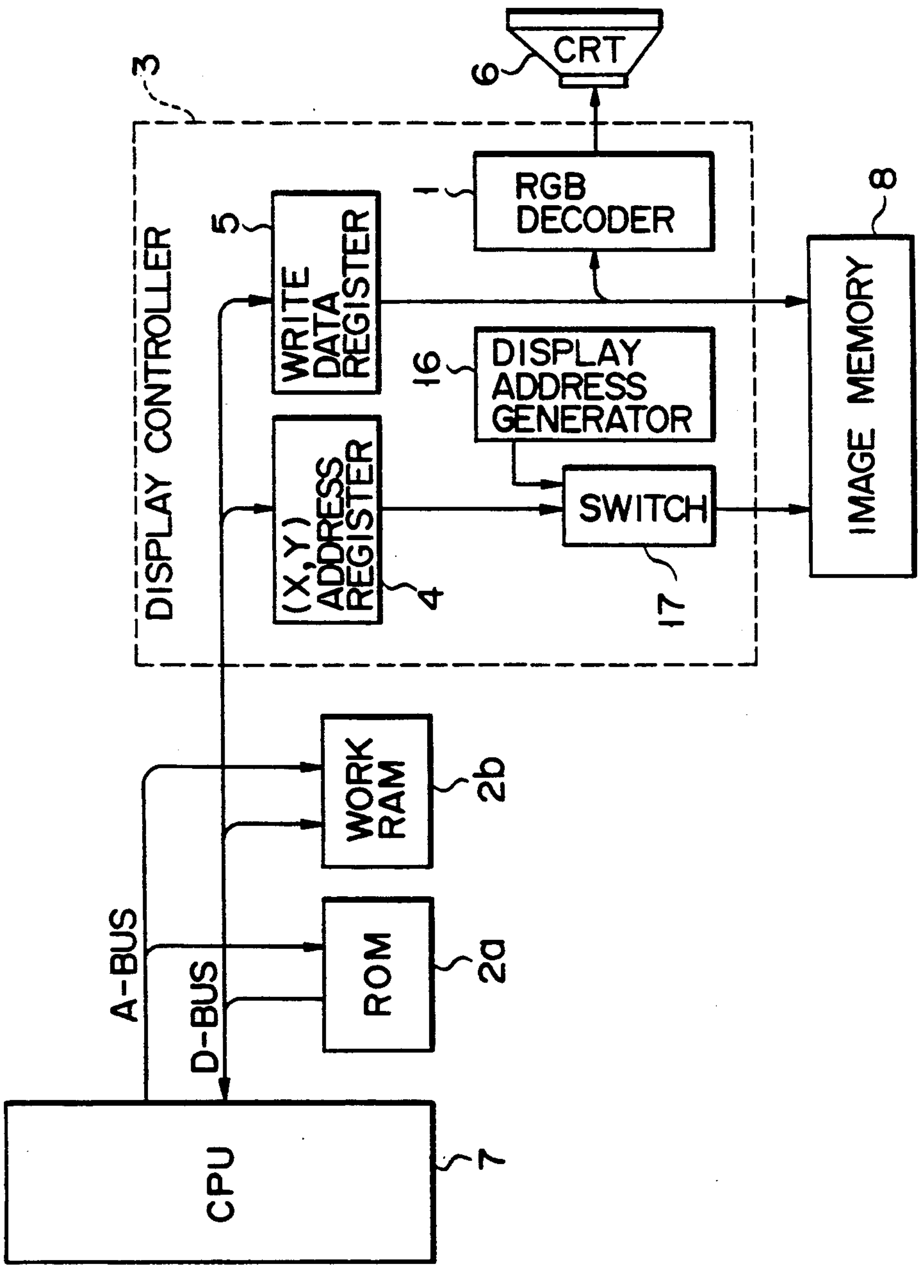
FIG. 1 (PRIOR ART)
FIG. 1 is a block diagram schematically showing a conventional data processing apparatus.

FIG. 1 schematically shows a conventional character data processing apparatus for performing memory control using the port transfer system. In the apparatus shown in FIG. 1, in order to write data in image memory 8, CPU 7 transfers (port transfer system) all addresses to be accessed and all data to (X,Y) address register 4 and write register 5 in display controller 3 through only data bus (D-BUS). In FIG. 1, reference numeral 2a denotes a program ROM of the CPU 7; and 2b, a work RAM for executing work including transfer address management performed in interruption processing or the like. CPU 7 supplies a chip enable signal from an address decoder (not shown) to work RAM 2b, and supplies an address data through an address bus (A-BUS) to work RAM 2b. Controller 3 includes display address generator 16, switch 17, and RGB decoder 1 between its registers and image memory 8. Decoder 1 is connected to external monitor CRT 6. Note that a data write sequence is mainly shown in FIG. 1 and a data read sequence is omitted therefrom.

Figure 2A:
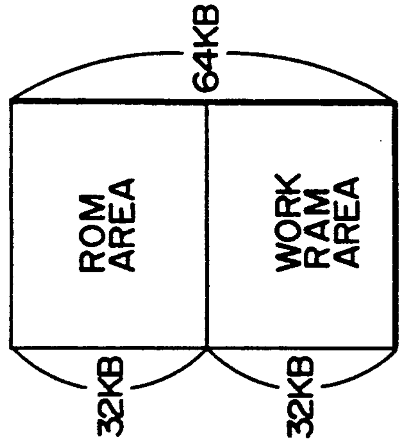
FIG. 2A (PRIOR ART)
FIGS. 2A and 2B are address maps for explaining an operation of the apparatus shown in FIG. 1.
Figure 2B:
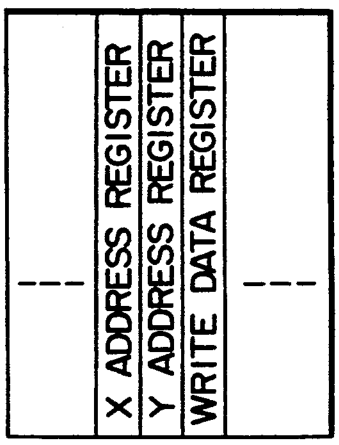
FIG. 2B (PRIOR ART)

FIGS. 2A and 2B are address maps of the above conventional apparatus showing a memory address area (FIG. 2A) and an I/O address area (FIG. 2B). In the memory address area (FIG. 2A) of a system of this type, an area of 32-K-byte is normally given to each of ROM 2a and work RAM 2b. Image memory is arranged in another memory area through the memory address space. Thus, image memory does not arrange in an address map on CPU 7. This is because data transfer is performed by the port transfer system in this conventional apparatus. Therefore, a memory of 64-K-byte for general purposes is completely occupied by ROM 2a and work RAM 2b. In addition, a memory area for image memory 8 must be provided.

That is, in order to execute a work routine including transfer address management performed in the interruption processing by work RAM 2b, extra memory address areas must be provided, and the software is overloaded.

Figure 3:
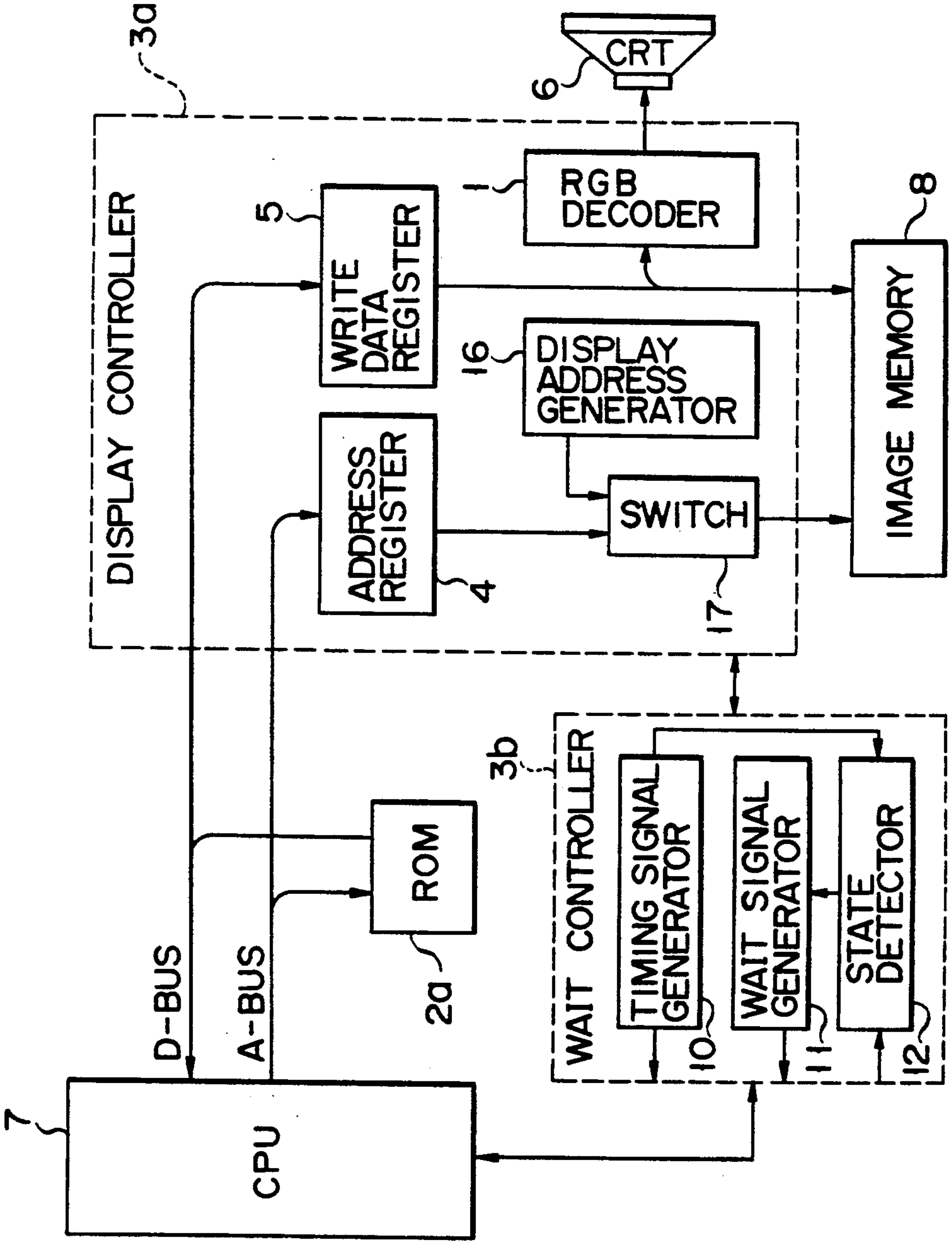
FIG. 3 is a block diagram schematically showing a data processing apparatus according to the present invention.

The present invention eliminates the above drawbacks of the conventional apparatus. First, the present invention will be briefly described below. As shown in FIG. 3, the present invention includes, in addition to the parts shown in FIG. 1, wait controller 3b consisting of timing signal generator 10 for generating and supplying a system clock to CPU 7, state detector 12 for detecting a current state of CPU 7 in accordance with a control signal (e.g., an RD, WR, or MREQ signal) from CPU 7, and wait signal generator 11 for generating an optimal wait signal. In the apparatus shown in FIG. 3, the port transfer system is not adopted. Therefore, CPU 7 transfers data independently to address register 4 and write data register 5 in display controller 3a through address bus (A-BUS) and data bus (D-BUS), respectively. In addition, wait controller 3b generates an optimal wait signal upon data transfer. Therefore, according to the present invention, a large-capacity work RAM of 32-K-byte need not be provided to perform transfer address management in the interruption processing.

With the above arrangement, generator 10 generates clocks for CPU 7 and can check a state of each clock. Therefore, generator 10 can check a relationship between the access period in which CPU 7 can access image memory 8 and the clocks of CPU 7. In addition, detector 12 can check the state of CPU 7, i.e., the state of CPU 7 can be detected in the access period of CPU 7 produced by the memory controller. Therefore, when CPU 7 accesses image memory 8, generator 11 can supply an optimal wait signal to CPU 7. As a result, even in the VIDEOTEX system or the like in which a large amount of data is read out from and written in image memory 8, data transfer can be efficiently performed in a short access period without providing an extra memory address area or increasing software as in the conventional port transfer system.

Figure 4:
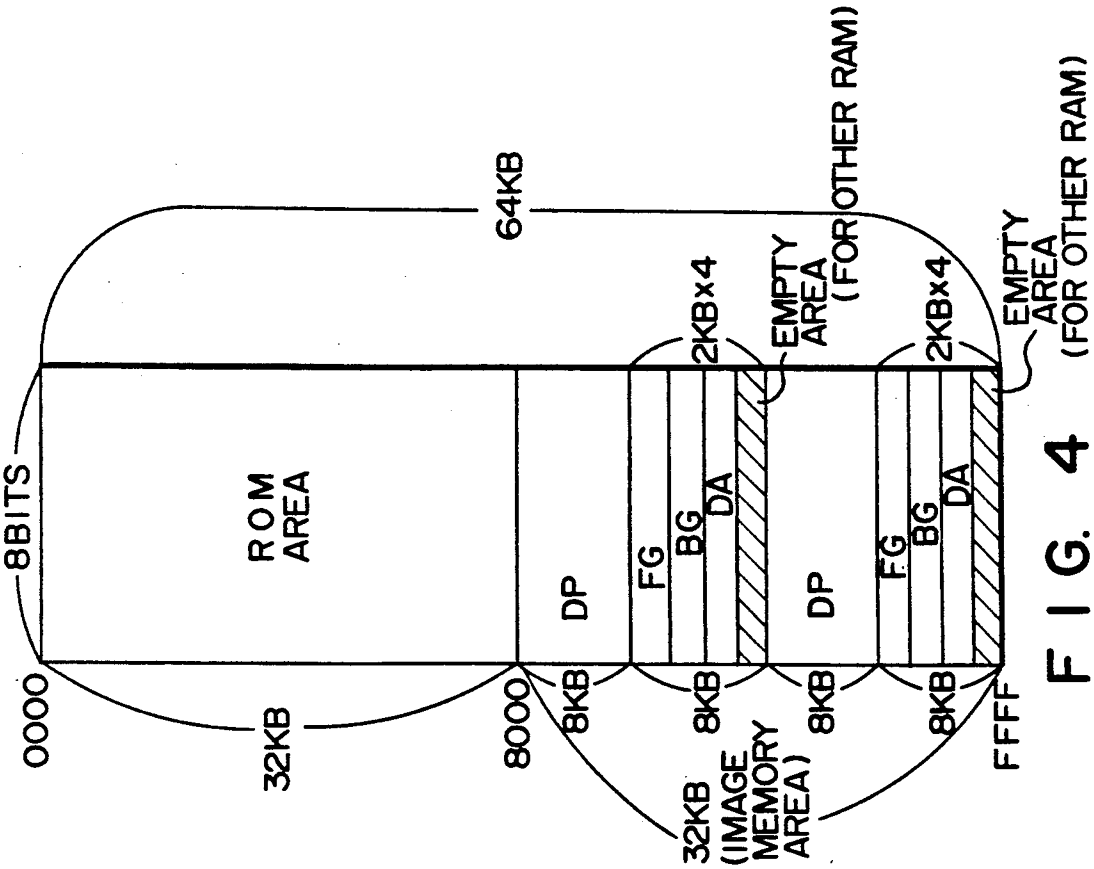
FIG. 4 is an address map for explaining an operation of the apparatus shown in FIG. 3.

FIG. 4 shows memory address areas as an address map of the apparatus shown in FIG. 3 obtained when it is adopted to the VIDEOTEX system. When a 64-K-byte memory is used, 32-K-byte corresponding to an upper half 0000H–8000H are assigned to ROM 2a, and remaining 32-K-byte corresponding to a lower half 8000H–0FFFFH are assigned to image memory 8 for two frames, i.e., a code frame and a pattern frame. That is because data transfer is not performed by the part transfer system, but an image memory area can be directly made on the address area of the CPU. Since at least 4-K-byte empty area is generated in the image memory area, this empty area can be used for any other RAM. That is, in each frame area, assume that a display area is 256 dots×256 lines, a coloring unit is a unit block of 4×4, each of FG and BG of coloring is 4 bits, and data attribute (DA) is 4 bits. In this case, if a dot pattern (DP) is 8-K-byte, FG is 2-K-byte, BG is 2-K-byte, and data flashing (DA) is 2-K-byte, only 14-K-byte are required for each frame area, i.e., only 28-K-byte are required as a total. Actually, since an effective display area need only be 248 dots×204 lines, an empty area is larger. Note that in FIG. 3, only a data write sequence is shown and a data read sequence is omitted for illustrative simplicity. However, the data read sequence will be described in the following embodiment and can be easily understood by those skilled in the art from the data write system.

An embodiment according to the data processing apparatus of the present invention will be described below with reference to the accompanying drawings.

Figure 5:
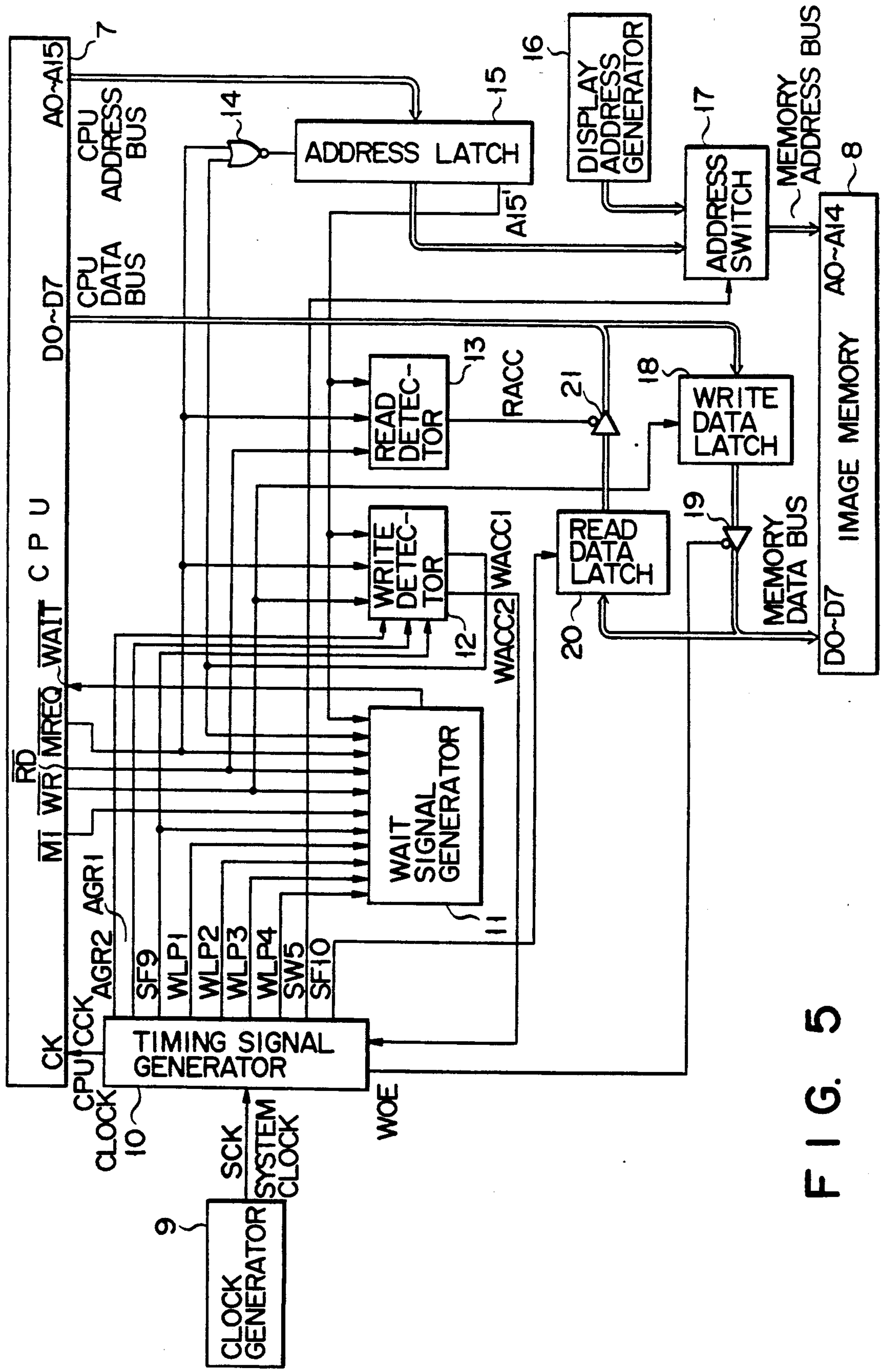
FIG. 5 is a block diagram of an embodiment according to the data processing apparatus of the present invention.

FIG. 5 shows an embodiment of the present invention, in which reference numeral 7 denotes a CPU for accessing image memory 8 to perform a data read/write operation. Clock CCK of CPU 7 is generated by timing signal generator 10 on the basis of system clock SCK generated by clock generator 9. Reference numeral 11 denotes wait signal generator for checking a state of CPU 7 and generating optimal wait signal WAIT on the basis of a control signal output from CPU 7 when it accesses image memory 8; and 12 and 13, write and read detectors for detecting that CPU 7 performs write and read operations, respectively. Address latch 15 latches addresses A0 to A15 output from CPU 7 through a CPU address bus by an output from NOR gate 14. These access addresses are switched to display addresses output from display address generator 16 by address switch 17 and supplied to image memory 8 through a memory address bus. Reference numeral 18 denotes a write data latch for latching write data output from CPU 7 through a CPU data bus. When buffer 19 is enabled, latched write data is supplied to image memory 8 through a memory data bus. Reference numeral 20 denotes a read data latch for latching data read out from image memory 8 through the memory data bus. When buffer 21 is enabled, latched read data is read by CPU 7 through the CPU data bus.

An operation of the above embodiment will be described below. FIGS. 6A to 6M are timing charts for explaining an operation of generator 10 shown in FIG. 5. Note that broken lines in FIGS. 6K and 6L indicate timings at which the write data from CPU 7 is actually written.

Figure 6:
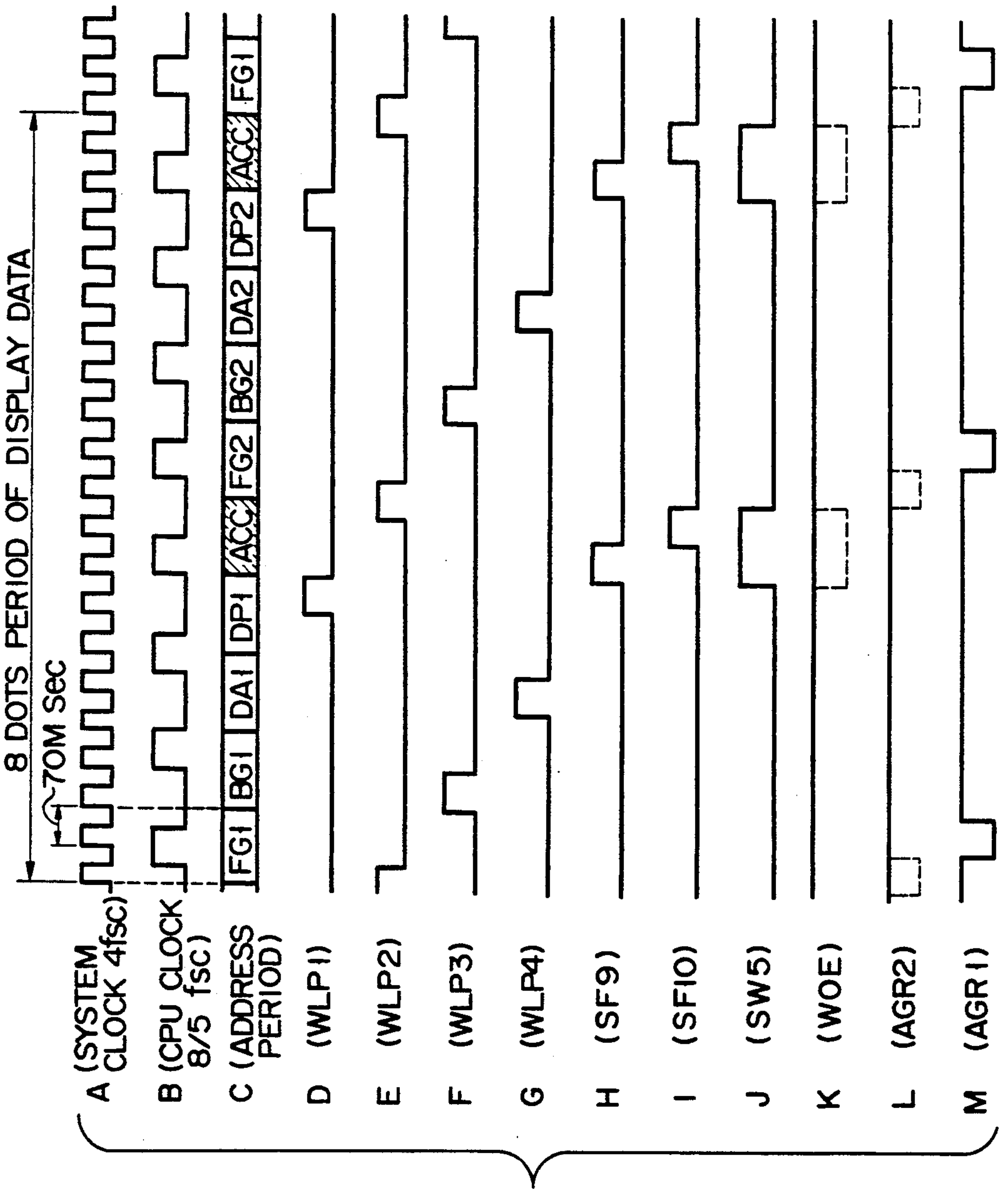
FIGS. 6, 8, 11 and 12 are timing charts for explaining operations of the respective parts of the embodiment shown in FIG. 5.

In this embodiment, 4 fsc (≃14.32 MHz) which is 4 times the color subcarrier frequency fsc is used as the system clock SCK (FIG. 6A waveform). As is apparent from FIGS. 6, waveforms A to M, an 8 clock CCK period (corresponding to an 8 dots period of display data) of 8/5 fsc (waveform B) corresponds to 20 clock periods of clock SCK of 4 fsc. As shown in correspondence to an address period of waveform C, assuming that a 2 clock period (≃140 nsec) of clock SCK is a basic unit, the 8 dots period of the display data corresponds to 10 basic units. In the VIDEOTEX system, since each of code and pattern frames is constituted by data of 4 types (i.e., an FG color, a BG color, flashing (DA), and a dot pattern (DP)), 8 dots data of 8 types must be read out in the 8 dots period. Therefore, two extra basic units are periodically generated. These two extra basic units which are periodically generated will be described below as access period ACC in which CPU 7 can access image memory 8.

Figure 7:
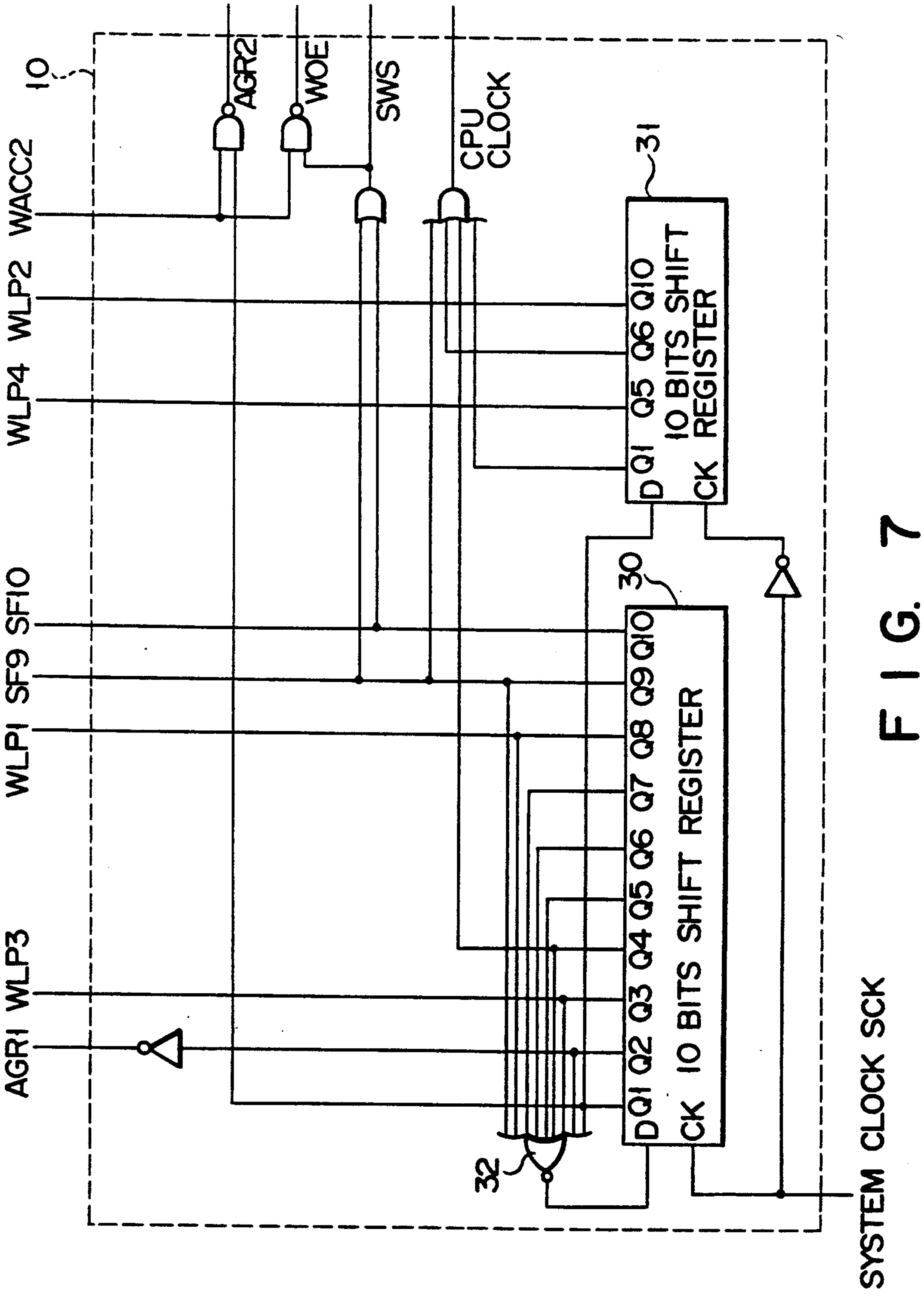
FIGS. 7, 9, 10, and 13 are circuit diagrams showing in detail the respective parts of the embodiment shown in FIG. 5.

In order to generate various signals to be described later in addition to clock SCK, generator 10 is constituted by two 10 bit shift registers 30 and 31 as shown in FIG. 7. NOR gate 32 initializes register 30. Signals WLP1 to WLP4 (waveforms D to G) generated from generator 10 are supplied to wait signal generator 11 to be described in detail later and used as reference latch pulses for checking a state of CPU 7. Signal SF9 (waveform H) represents a start timing of period ACC. Signal SF10 (waveform I) is used as a latch pulse for latching data read out from image memory 8 to latch 20. Signal SW5 (waveform J) is a switch pulse for switching switch 17 to select CPU 7 in period ACC. Signal WOE (waveform K) is a write output enable signal for opening buffer 19 in period ACC when CPU 7 is in a write operation mode. Signals AGR2 and AGR1 (waveforms L and M) are supplied to detector 12 to be described in detail later and used to detect that CPU 7 is in the write operation mode.

Figure 8:
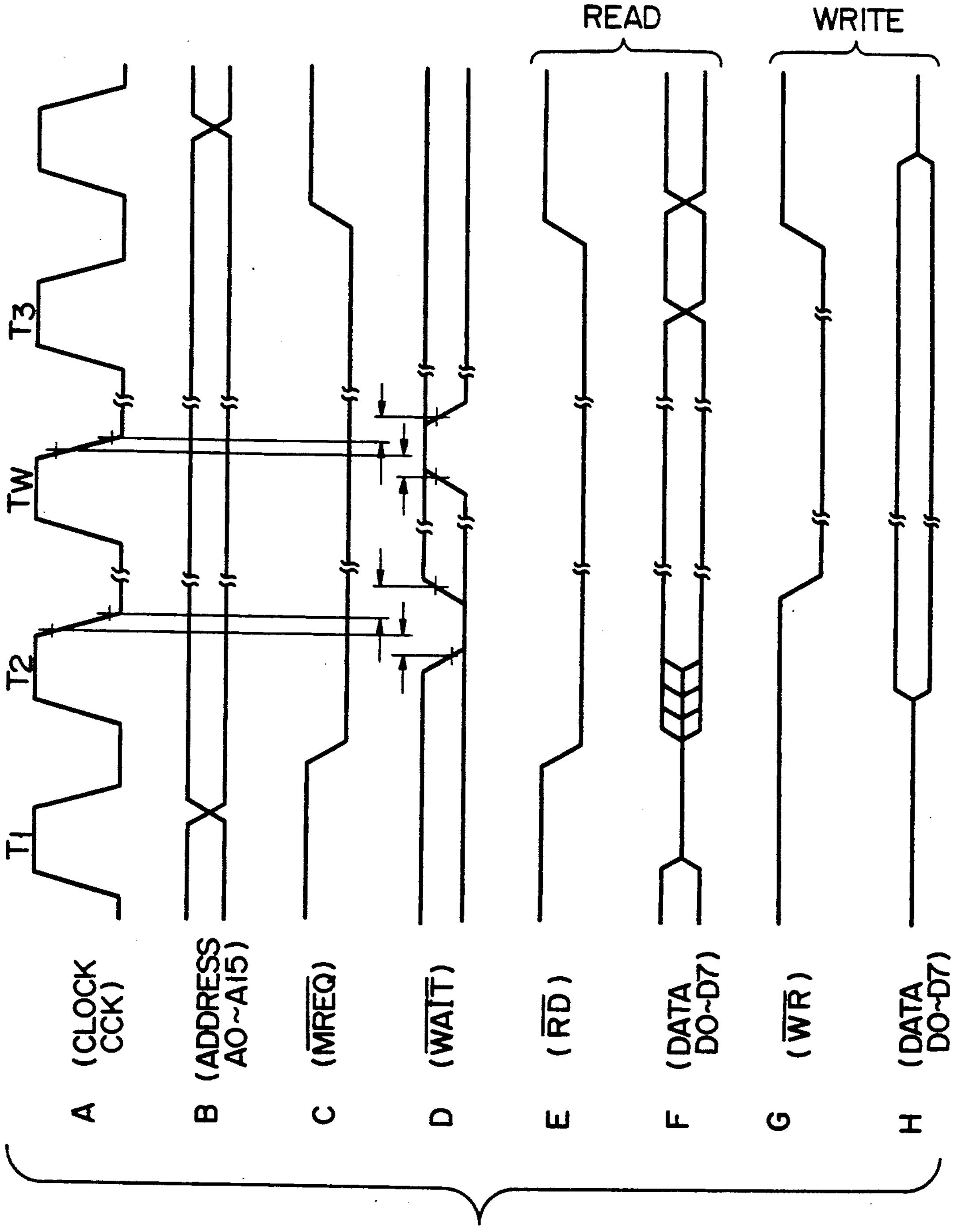

An operation performed when CPU 7 writes data in image memory 8 will be described below. FIG. 8, waveforms A–H are timing charts for explaining this operation of CPU 7.

(1) Write addresses A0 to A15 from CPU 7 are latched by latch 15 through the CPU address bus using signal $\overline{MREQ}$ (waveform C) from CPU 7 as a latch pulse. In this case, the addresses are latched when signal $\overline{MREQ}$ from CPU 7 goes to level "L" through NOR gate 14. Signal WACC1 supplied to the other input terminal of NOR gate 14 from detector 13 is normally at level "L".

(2) When signal $\overline{WR}$ (waveform G) from CPU 7 rises, write data output from CPU 7 though the CPU data bus is stored in latch 18.

(3) When CPU 7 performs such a write operation, detector 12 detects this operation and outputs signals WACC1 and WACC2.

Figure 9:
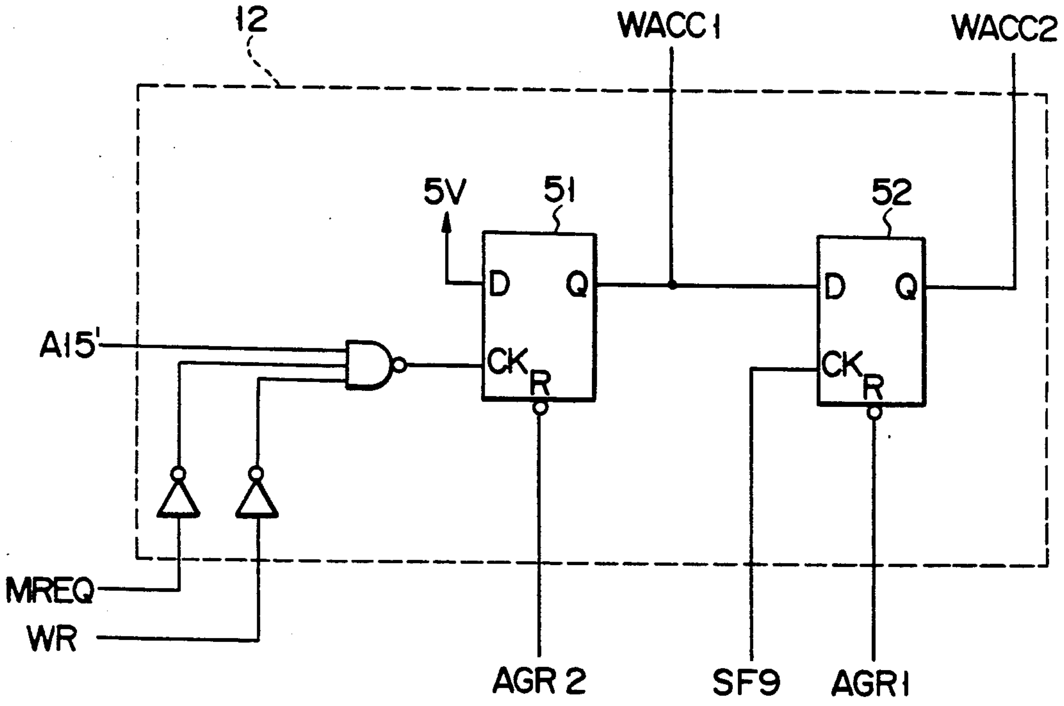

An arrangement of detector 12 shown in FIG. 9 will be described below. In this embodiment, the lower half 8000H–OFFFFH of 64-K-bytes (16 lines of A0 to A15) is used as an area for image memory 8 as described above. Therefore, when signal A15′ latched by latch 15 is at level "H" and image memory 8 is subjected to the write operation, a Q output (signal WACC1) of D flip-flop 51 goes to level "H". This signal of level "H" is latched to D flip-flop 52 by signal SF9 which represents the start of period ACC, and signal WACC2 goes to level "H". Signal WACC1 is returned to level "L" by signal AGR2 output when signal WACC2 goes to level "H" (i.e., image memory 8 is subjected to the write operation). Signal WACC2 is returned to level "L" by signal AGR1 after signal WACC1 goes to level "L". The write address and data are supplied to image memory 8 from switch 17 and buffer 19 during period ACC, thereby writing the data.

Since signal WACC1 goes to level "H" when CPU 7 starts to write data in image memory 8, the latch pulse (output from NOR gate 14) from latch 15 goes to level "L", and the write address is held even if CPU address pulses A0 to A15 are changed. This address is held until the data is written in image memory 8. (After the data is written, signal WACC goes to level "L".) That is, signal WACC1 represents that the write operation of CPU 7 is ended, and signal WACC2 represents that the write operation is being performed.

(4) When the write operation is to be continuously performed, generator 11 generates signal $\overline{WAIT}$. This operation will be described below.

Figure 10:
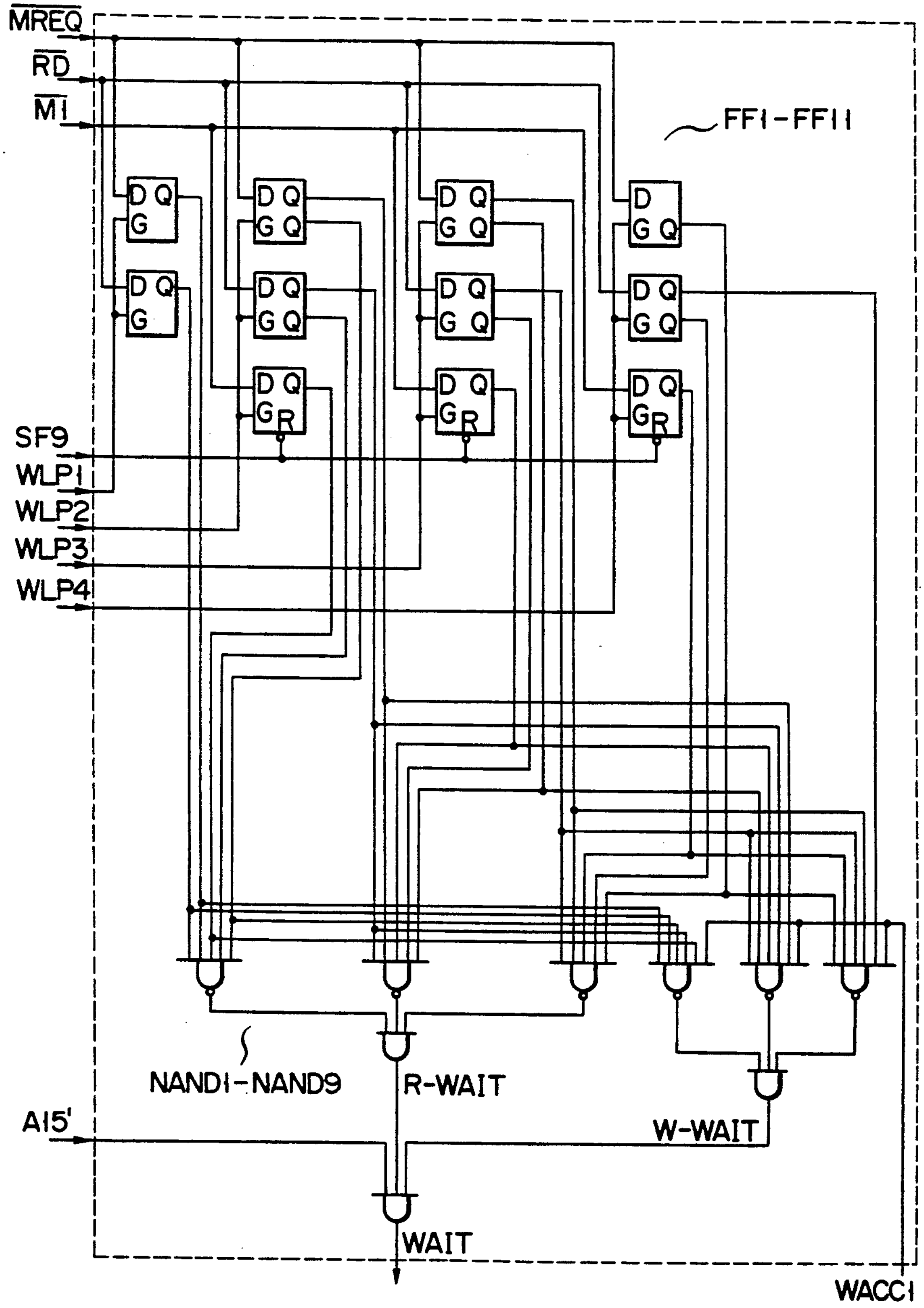
Figure 11:
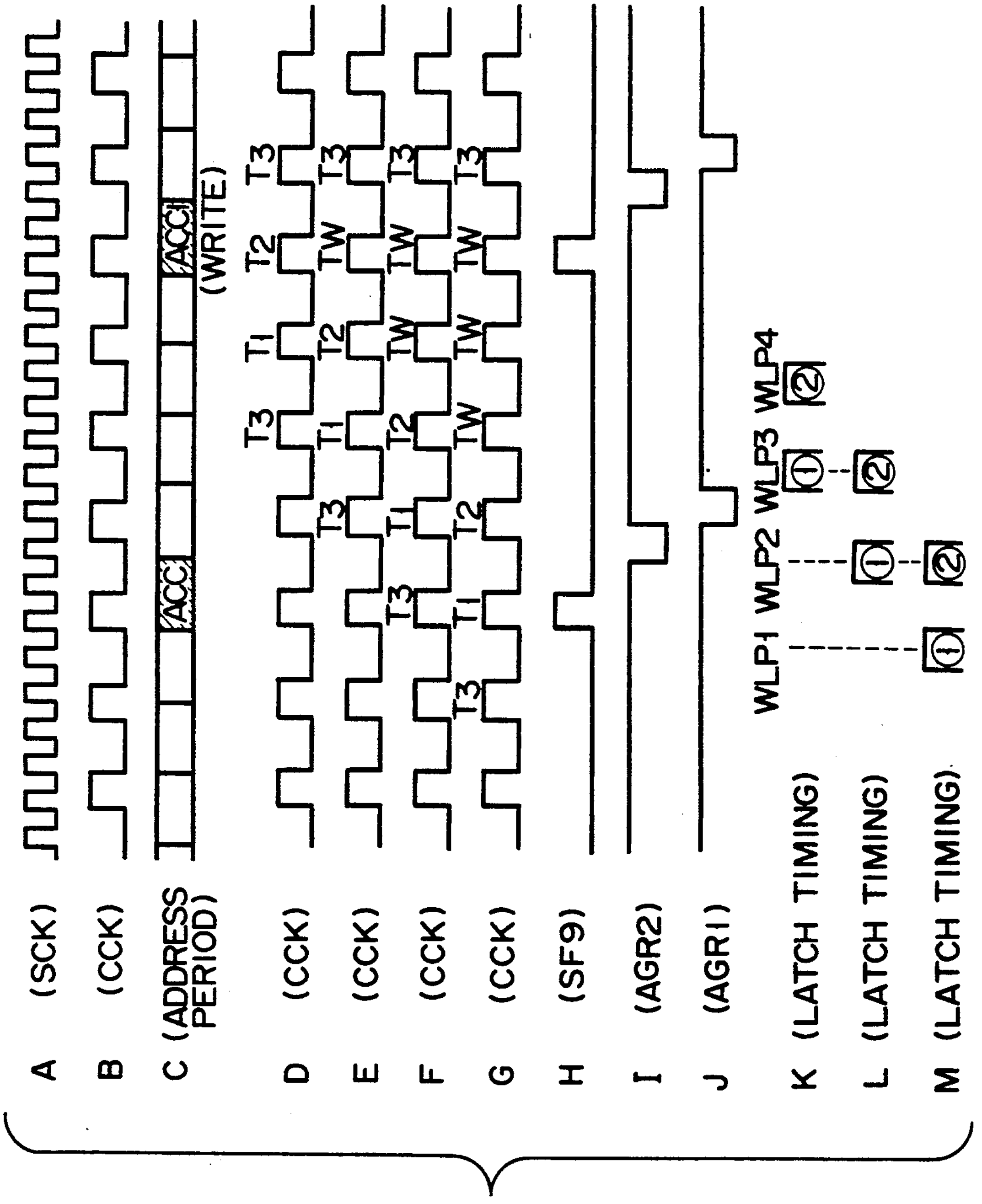

FIG. 10 shows an arrangement of generator 11, and FIG. 11, waveforms A–M are timing charts. Note that FIG. 10 includes a wait signal generator which consists of eleven flip-flops FF1 to FF11 and nine NAND gates NAND1 to NAND9 and operates during a read operation.

In FIG. 8A and waveforms D–G, FIG. 11, reference symbols T1, T2, and T3 represent states of CPU 7; and Tw, a wait state of CPU 7. As shown in the timing charts of H of FIG. 8, rise of signal $\overline{WR}$ of CPU 7 (which corresponds to detection of the write operation) occurs in synchronism with the fall of clock T3. Therefore, at a timing of waveform D, a write operation occurring at first T3 is processed in access period ACC1, and a write operation at next T3 is processed in the next access period. Therefore, when the write operation continues at the timing of waveform D, signal $\overline{WAIT}$ need not be generated.

At a timing of waveform E, a write operation occurring at first T3 is processed in period ACC1. In this case, if the next write operation occurs, the next write operation comes before the first write operation is completely processed. (This is because clock T3 is placed at Tw of waveform E.) Therefore, signal $\overline{WAIT}$ is generated to insert wait clock Tw in this period.

Similarly, by inserting two and three clocks Tw in waveforms F and G, respectively, the write operation can be processed at a proper timing. Note that in waveform G, the clock is inserted to obtain a delay time margin.

In order to generate signal $\overline{WAIT}$, generator 11 samples control signals (signals $\overline{MREQ}$, $\overline{RD}$, and $\overline{M1}$) from CPU 7 at proper timings to check a state of CPU 7. These sampling pulses are signals WLP1 to WLP4 from generator 10 shown in waveforms D to G. In waveforms K–M of FIG. 11, the control signals from CPU 7 are sampled at timings ① and ②. Occurrence of the write operation is detected when $\overline{MREQ}$="H" and $\overline{RD}$="H" at timing ①, and when $\overline{MREQ}$="L", $\overline{RD}$="H", and $\overline{M1}$="H" at timing ②. In this case, signal $\overline{M1}$ goes to leve "L" in a T1 state. In this embodiment, a wait state of CPU 7 is defined with respect to the fall of clock T2. Waveforms K–M correspond to waveforms E–G, respectively. Therefore, when the write operation is detected at a timing of FIG. 11K, signal $\overline{WAIT}$ is generated to generate one clock Tw. When the write operation is detected at timings of waveforms L and M, signal $\overline{WAIT}$ is generated to generate two and three clocks Tw, respectively. The wait state is released by resetting the D latch obtained by latching signal $\overline{M1}$ at the timing of signal SF9. In addition, in the write operation, signal $\overline{WAIT}$ may be generated when signal WACC1 is at level "H" (i.e., the write operation is not completely processed) and the next write operation occurs. Therefore, signal $\overline{WAIT}$ is gated and output by signal WACC1.

Figure 12:
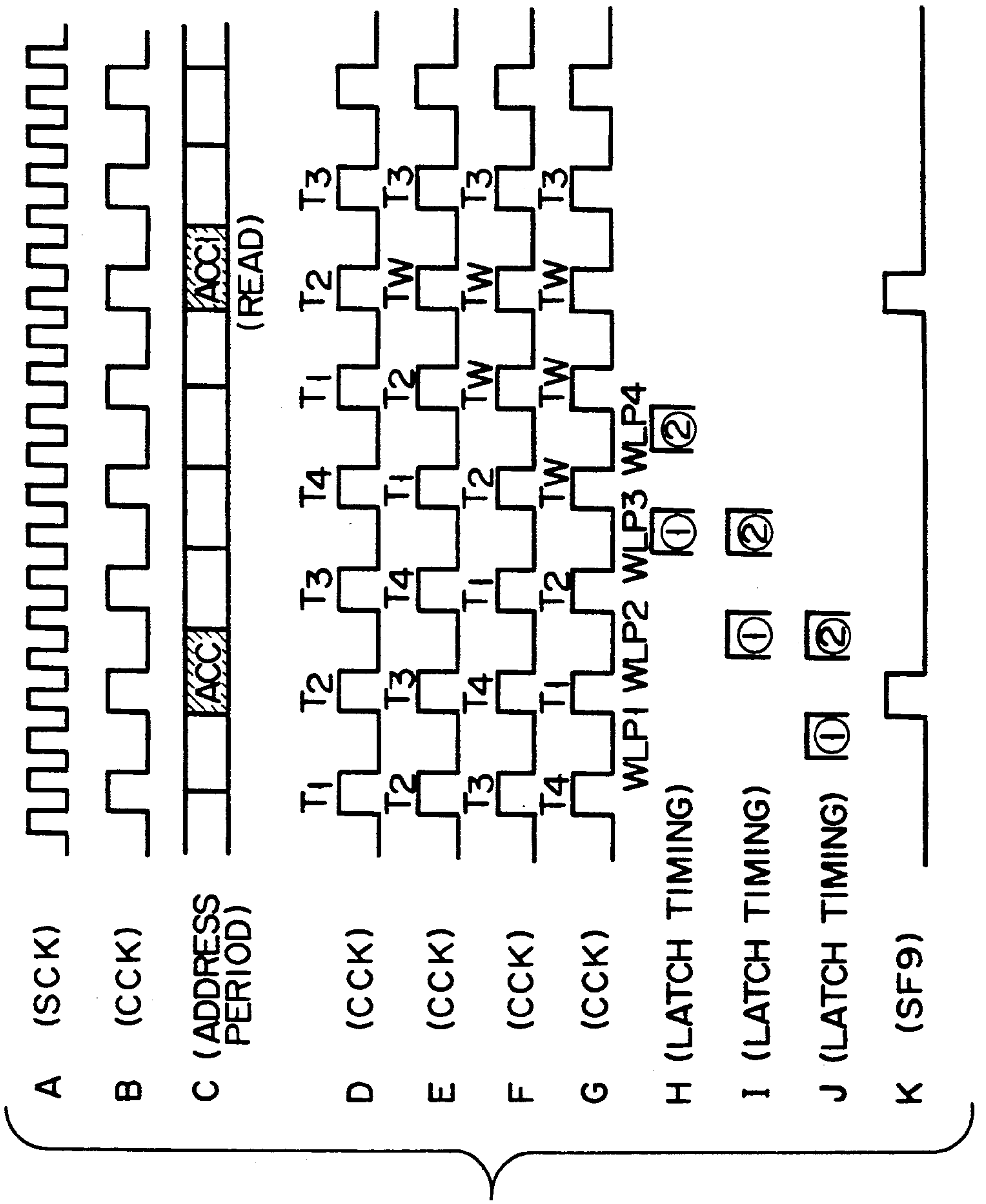

An operation performed when CPU 7 reads out data from image member 8 will be described below. FIG. 8 is a timing chart of control signals of CPU 7 in the read operation. FIG. 12 is a timing chart of the embodiment in the read operation. FIG. 10 shows a signal $\overline{WAIT}$ generator. Note that signal $\overline{WAIT}$ is generated in the same manner as in the write operation and a detailed description thereof will be omitted.

Figure 13:
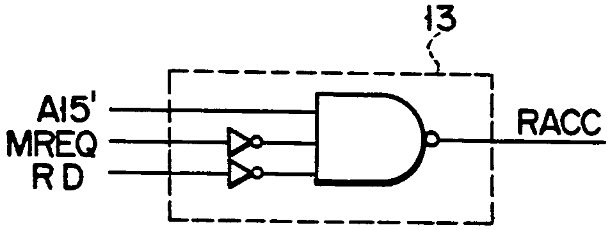

In order to read data, CPU 7 outputs the data when signal $\overline{RD}$ rises. The rise of signal $\overline{RD}$ occurs in synchronism with the fall of clock T3. Therefore, when the read operation occurs, signal $\overline{WAIT}$ is generated so that clock T3 crosses period ACC. Data from the memory data bus is latched to latch 20 of FIG. 5 at a timing of signal SF10 (the access period is ended). As shown in FIG. 13 in detail, detector 13 generates a signal which is enabled in synchronism with signal $\overline{RD}$ when CPU 7 accesses the image memory area (8000H to 0FFFFH). At this timing, buffer 21 is enabled to output data to the data bus of CPU 7.

As has been described above, in this embodiment, since an optimal wait signal can be generated in accordance with a state of CPU 7 with respect to access period ACC, data transfer can be efficiently performed. In addition, CPU 7 can apparently directly access image memory 8 without providing a work RAM for conventional transfer address management. Therefore, a burden on software for data transfer processing can be reduced.

Furthermore, in the present invention, the CPU clock is generated from the timing signal generator, and a state (e.g., T1, T2, and T3) of the clock can be checked by the state detector. For this reason, the state detector samples the control signals (e.g., signals $\overline{MREQ}$, $\overline{RD}$, and $\overline{M1}$) of the CPU so that the wait signal generator generates an optimal signal $\overline{WAIT}$. As a result, data transfer can be efficiently performed even in the VIDEOTEX system in which a large amount of data can be accessed with respect to the image member.

What is claimed is:

1. A memory control apparatus for accessing an image memory as to write/read VIDEOTEX signals each having two frames, each said frame including 8 dot data arranged in a 4×2 array, to/from said image memory through a CPU, said apparatus comprising:

system clock generating means for generating a system clock signal having a frequency of an integer number of times a frequency of a color subcarrier (fsc) included in a video signal which carries said VIDEOTEX signals, where 2 clock pulses of said system clock constitute a basic unit;

timing signal generating means for generating a CPU clock signal constituted by 8 CPU clocks for each said two frame VIDEOTEX signal, corresponding to said 8-dot data and occurring during a time of 10 reference clocks and supplying it to the CPU to control operation of the CPU, and for assigning the CPU a memory access period of one basic unit for every display period for displaying 4-dot data, said timing signal generating a first reference pulse in synchronism with a CPU clock in accordance with the system clock signal and a second reference pulse relating to the memory access period;

CPU state detecting means for detecting a timing of the write/read operation as a CPU state in accordance with an access control signal supplied from the CPU and the first reference pulse;

wait signal generating means for generating a predetermined number of 0–3 wait signals, each for commanding a waiting operation in a read/write operation, in accordance with a timing and a subsequent memory access period, to supply a suitable number of wait signals to the CPU on the basis of a detection result obtained from said CPU state detecting means; and release means for releasing the generation of the wait signal by said wait signal generating means in accordance with the second reference pulse generated by said timing signal generating means, wherein said memory control apparatus ensures that the CPU performs a write/read operation at a correct timing by a predetermined number of wait signals supplied to the CPU, even if a read/write operation occurs during the previous read/write operation.

2. An apparatus according to claim 1, further comprising said image memory which has an address terminal and a data terminal for writing/reading data to be processed, the data having data of a plurality of types which appear in a predetermined period.

3. An apparatus according to claim 2 further comprising said CPU which has a data port and an address port for independently transmitting/receiving the data to be written/read out from said image memory and an address for the data, a wait port for receiving said wait signals, a clock port for receiving said reference clock having a plurality of states including periods corresponding to the period of the data and an access period for a write or read operation of the data, and a predetermined control port for receiving/transmitting a predetermined control signal, in accordance with an operation of said CPU, said CPU being operated in accordance with a program for processing the data in correspondence to the predetermined period and the wait signal.

4. An apparatus according to claim 3, further comprising display control means which has data fetch means and address fetch means connected between the data port and the address port of said CPU and the data terminal address terminal of said image memory, respectively, said data fetch means and address fetch means being connected to the control ports of said CPU.

5. An apparatus according to claim 4, wherein said timing signal generating means generates the reference clock which is supplied to the clock port of said CPU and which defines an operation of said CPU, and generates a predetermined reference pulse for presenting a relationship between the reference clock and the access period.

6. An apparatus according to claim 5, wherein said CPU state detecting means receives the reference pulse from said timing signal generating means and the predetermined control signal from the control port of said CPU, to detect an operation state of said CPU with respect to the access period of the reference clock.

7. An apparatus according to claim 6, wherein said wait signal generating means generates said predetermined number of wait signals in accordance with a detection result from said CPU state detecting means.

8. An apparatus according to claim 4, wherein said display control means further comprises display address generating means and address switching means for switching a display address from said display address generating means and an address from said address fetch means.

9. An apparatus according to claim 1, wherein when there are 8 types of said data, the number of reference clocks per predetermined period is 10, 8 out of the 10 reference clocks being assigned to display periods of the 8 types of data, and the remaining two clock periods being assigned to the access periods.

10. An apparatus according to claim 9, wherein one clock period is assigned to the two clock periods after the first 4 of the 8 types of data are displayed, and one clock period is assigned to the two clock periods after the next 4 types of data are displayed.

11. An apparatus according to claim 10, wherein said timing signal generating means generates, as the reference pulse, a 4-bit latch pulse train in which the 4 bits have intervals corresponding to a length of 4 reference clocks and timings offset by one clock period.

12. An apparatus according to claim 11, wherein said CPU state detecting means samples a control signal that indicates detection of a write or read operation from said CPU by the 4-bit latch pulse train.

13. An apparatus according to claim 11, wherein said wait signal generating means changes the number of wait signals from 0 to 3, in accordance with a degree of margin of an interval between a state of said CPU and the access period when said operation state detecting means latches the control signal.

14. An apparatus according to claim 13, wherein said image memory is assigned to a 32-K-byte area from $8000_H$ to $FFFF_H$ of a 64-K-byte memory, and a remaining 32-K-byte memory area is assigned to a program ROM of said CPU.

15. An apparatus according to claim 14, wherein at least a 4-K-byte area of the 32 K-bytes to which said image memory is assigned to any other RAM.

16. An apparatus according to claim 1, wherein said CPU state detecting means detects at least one of the write and read operations of said CPU.

* * * * *